United States Patent [19]

Thiedemann

[11] 4,026,507

[45] May 31, 1977

[54] APPARATUS FOR SUPPORTING PIPE LINES OR THE LIKE

[76] Inventor: Karl-Heinz Thiedemann, An der Stipskuhle 42, 46 Dortmund, Germany

[22] Filed: Oct. 17, 1975

[21] Appl. No.: 623,546

[30] Foreign Application Priority Data

Oct. 21, 1974 Germany .......................... 2449944

[52] U.S. Cl. ................................ 248/54 R; 248/59
[51] Int. Cl.² .......................................... F16L 3/00
[58] Field of Search ............. 248/54 R, 54 CS, 49, 248/58, 59; 267/69, 70, 71, 73, 74

[56] References Cited

UNITED STATES PATENTS

| | | | |
|---|---|---|---|
| 2,713,982 | 7/1955 | Sherbrooke | 248/54 R |
| 2,936,142 | 5/1960 | Sherburne | 248/54 R |

FOREIGN PATENTS OR APPLICATIONS

| | | | |
|---|---|---|---|
| 77,408 | 2/1955 | Netherlands | 248/54 R |

Primary Examiner—Robert A. Hafer
Attorney, Agent, or Firm—Bacon & Thomas

[57] ABSTRACT

An apparatus for supporting pipe lines or the like on a supporting structure. The apparatus includes a housing for connection with the supporting structure and a pressure spring in the housing. The spring acts on a spring rest which is coupled with a support element in such a manner that the support element may be rotated to longitudinally adjust the position thereof relative to the spring rest. A preset spring force, corresponding with the pipe load anticipated during use and for offsetting such load, is maintained by a simple blocking device. The blocking device may include a crossbolt selectively connectable with the support element for blocking longitudinal movement of the spring rest. The arrangement of elements is such that, even when the blocking device is effective, the support element may still be rotated to effect further adjustment of the relative position of the spring rest and thus of the preset force of the spring. Also, the blocking device may selectively cooperate with a screw element, attached to the support element, to lock the support element in substantially any relative longitudinal position with respect to the spring housing.

12 Claims, 6 Drawing Figures

APPARATUS FOR SUPPORTING PIPE LINES OR THE LIKE

BACKGROUND

1. Field of the Invention

The invention relates to an apparatus for supporting pipe lines or the like on a supporting structure.

2. Description of the Prior Art

U.S. Pat. No. 2,159,870 to E. A. Wert discloses a spring shackle for the suspended support of a pipe line. The device includes a cylindrical spring housing with an upper cover plate suspended from the supporting structure and a lower housing bottom. A cylindrical pressure spring is arranged within the housing. Above the pressure spring is a spring rest. A threaded spindle depends from the spring rest and a turnbuckle is provided. The pipe line is suspended via a pull rod screwed into the turnbuckle. By rotating the turnbuckle, the spring force is adjusted for operation.

The spring force adjustment in this structure is intended to be carried out in such a way that the pipe line is positioned with relation to the supporting structure at a precisely prespecified level, i.e., free of bending strain, and at equilibrium. This adjustment operation is often difficult, since it cannot be determined from the outside whether the pipe line arrangement is free of strain or whether strain may still exist in an apparently correctly suspended pipe line.

It has therefore become customary to pre-calculate the forces to be absorbed by the individual spring shackles in a pipe line system and to preset the spring force of the spring shackles accordingly in the factory. The presetting is achieved by compressing the spring so that it exerts a force corresponding to the load which the shackle will support and then maintaining that degree of compression by a blocking device. Since, as just indicated, the presetting corresponds to the load to be absorbed by the spring shackle when installed, nothing changes at the removal of the blocking device if the pipe line has been suspended at the correct level by means of the spring force lock, and the pipe line, freely suspended from the pressure spring, is in equilibrium.

Another reason for the provision of blocking devices is that, in the construction of pipe line systems that are supported by spring shackles, a temporary overloading often cannot be avoided. This will happen, for example, when completely installed steam lines are later treated with a pickling fluid and the total weight of the pipes during the pickling cycle amounts to a multiple of the weight of the pipe lines when they are in condition for operation with the steam cycle. Thus, blocking devices are also customary for the purpose of absorbing overloads of the pressure spring caused by such temporary load increases.

U.S. Pat. No. 2,936,142 to P.C. Sherburne discloses a blocking device wherein I-sections are inserted into a longitudinal slot of the spring housing. The transverse portions of the I-sections abut against the outside of the housing and the leg portions of the I-sections, act against the spring rest in order to lock the latter in the longitudinal direction. In the case of the "hot" load blocking, i.e., in the blocking of the pipe line against a load corresponding to its normal steam-carrying state, the I-sections are inserted between the upper side of the spring rest and the upper end of the longitudinal slot. In "cold" load blocking, i.e., in blocking against higher loads, the I-sections are inserted between the lower side of the spring rest and the lower end of the longitudinal slot. Of course, both measures can also be taken simultaneously. The I-sections are secured against sliding out of the slots by wires wound about the spring housing and the I-sections.

U.S. Pat. No. 2,713,982 to W. A. Sherbrooke discloses another type of blocking device wherein radial screw bolts engage the spring housing from the outside to act against the spring rest and lock it at a specific level.

Both types of blocking devices present the common disadvantage that blocking is possible with a specific spring presetting only and, in the case of the I-sections of U.S. Pat. No. 2,936,142, it is necessary to specifically cut each blocking device to size for each spring shackle. This requires substantial work and therefore substantial expense. Moreover, storing of the blocking elements for subsequent shutdown and overhaul of the pipe line system is impractical, and, in practice, it is likely either that the blocking devices will be lost or that they will become unsorted. It is also a particular disadvantage that the blocking elements, on account of deviations in calculated force values from actual conditions, usually no longer fit after the first mounting.

As to the device disclosed in U.S. Pat. No. 2,936,142, there is also the disadvantage that during the "cold" load blocking, the inner diameter of the spring housing and the outer diameter of the spring rest must be considerably larger than the outer diameter of the spring. Otherwise, there cannot be a safe support of the spring rest against large load, since large deflections would cause expansion and consequent obstruction of the pressure spring. Therefore a larger form of structure must be accepted and the stabilization and guidance of the pressure spring is impaired.

SUMMARY OF THE INVENTION

It is an object of the invention to provide an apparatus of the foregoing type for supporting pipe lines or the like but which has the capability for continuous or stepless presetting of the spring force and blocking of the spring action at any value within a certain range and which may be economically produced.

To achieve this, the blocking device according to the invention engages a support element in such a manner that rotation of the latter still remains possible.

Rather than acting against the spring rest, the blocking device acts against a support element which is adjustable relative to the spring rest. Thus, the blocking is not limited to certain positions of the spring rest, and therefore it is also not limited to certain presettings of the spring force. The support element is always rotatable when the longitudinal blocking is in effect. This makes it possible to preset the spring force by rotating the support element without any supplementary means and also makes it possible to carry out readjustments at any time.

The invention may be embodied, for example, in an apparatus having a rotatable but axially fixed collar supported by the housing of the apparatus. The collar surrounds the support element. Through aligned transverse holes in the collar and in the support element, a crossbolt may be inserted to effect blocking of the support element in the longitudinal direction and to also serve as a handle for rotating the support element.

In so-called "hot" operating lines the load changes frequently when the operation is being started or when variations in operation take place. The lines are installed in a cold state, and, due to the heating which takes place in the operation and the thermal expansion resulting therefrom, displacements of the pipe lines and of the support element relative to the housing occur. In, for example, the foregoing type of blocking device which operates with crossbolts, it becomes impossible to carry out a warm load blocking. That is, the forces actually present in the operating position under a hot temperature cannot be blocked, since, due to these very displacements, the crossbolts can no longer be introduced.

Accordingly, it is an important object of the invention to provide a blocking device including a locking means by which the support element can be locked with respect to the housing in any relative, longitudinal position.

This object is achieved by the present invention which provides for blocking of any force that happens to prevail on the device. It is therefore possible, for example, to adjust a pipe line in the hot state to exactly the correct level and to maintain the actual balance of forces resulting therefrom. Thus, if an intermediate dismantling is required, the proper conditions for the hot state can thereafter be immediately reestablished.

In an advantageous embodiment, the continuous locking capability can be realized by providing a threaded, coaxial screw element on or in the support element, which screw element is longitudinally displaceable relative to the support element and which can be locked on the housing in any position of rotation.

The locking, according to the invention, of the support element on the housing therefore takes place via the screw element. This device, then, provides simplification of the locking of the support element. Other locking means which are effective in any position of the support element, for example, plier-like devices, are in fact expensive and unreliable in their effect. Locking means operating with bolts or the like are much simpler but permit a locking only in specific locking places. When, on the other hand, a screw element is provided, it can be locked with simple locking means, such as bolts or the like, without thereby relinquishing the stepless or continuous locking capability of the support element. In any position of the support element, the specific locking position of the screw element can be reached by the adjustment thereof, and the screw element can be locked on this position in a stable and precise manner by simple means. The screw element may be shaped as a threaded sleevers screwed upon the support element, and the locking of the threaded sleeve on the housing may be carried out by means of a crossbolt.

In a preferred embodiment of the invention, a rotatable collar surrounds the support element at the place where the support element emerges or extends from the housing by passing through an opening in a transversely extending wall or end portion of the housing. The collar has an annular shoulder disposed inside the housing beyond the edge of the opening. The collar may be selectively connected with the screw element at the portion of each that protrudes to the outside of the housing.

To suitably effect this connection, the screw element and the collar are provided with transverse holes which may be aligned, and the support element is provided with a corresponding oblong hole extending in the longitudinal direction. A crossbolt, which may be passed through all holes, is also provided.

On the one hand, the crossbolt secures the screw element with respect to the collar and prevents extraction. On the other hand, the crossbolt, by abutment against the outside of the housing, also prevents the screw element, from being pulled into the housing by the force of the pressure spring. After the crossbolt has been extracted, the screw element and the support element in the collar are freely movable in the longitudinal direction with respect to the collar. When the crossbolt is inserted, it serves also as a pivoting element and allows the support element, screw element, and collar to pivot with respect to the housing, whereby the spring force is altered.

Thus, a stepless presetting of the force of the pressure spring and correction thereof on the construction site is possible without resorting to expensive devices. After the removal of the crossbolt from the collar and the screw element, the screw element and the support element become free. Hence, the spring shackle then becomes ready to function for the prespecified conditions of operation. Prior to later shutdown and overhaul operations on the pipe line system, the collar and spring force lock are reconnected by a readily available round steel bolt which then forms the crossbolt. At that time the support element is relocked on the spring housing. When the load is removed, a preset spring force results which corresponds exactly to the last supported load.

Then, at the start of "hot" load operations a displacement of the line occurs under the effect of thermal expansion or other possible circumstances. This results in a corresponding displacement of the screw element relative to the collar, and the crossbolt can no longer be inserted, since the transverse holes are no longer in alignment.

With the crossbolt extracted, the screw element is then rotated until, by the displacement of its transverse hole in the axial direction, the alignment with the transverse hole of the collar is reestablished. The support element does not rotate in this operation since otherwise the height of center of the line changes. The transverse holes of the collar and the screw element as well as the slot in the support element are sized in such a manner with respect to the crossbolt that the latter can always be reapplied in the manner described.

Easy maintenance of the correct presetting of the spring force in the assembly results from the ease with which the crossbolt can be removed. When the apparatus of the invention is mounted on the support structure, when the pipe line is connected via the usual support or pull rod, and via a coupling element, to the support element, and when the pipe line is positioned at the proper level, the load of the pipe line and the force produced by way of the presetting should be at equilibrium after removal of the rigid support. That is, no displacements of the support element in longitudinal direction should take place. The crossbolt is then readily removable. If however, this should not be the case, possible corrections can then easily be carried out by rotating the crossbolt. In this process the crossbolt carries along with it the collar, the screw element, and the support element. In this way the support element is adjusted relative to the spring rest until the force of the pressure spring reaches such a value that equilibrium prevails. Then, the crossbolt may be readily extracted.

In order to avoid the necessity of threadably moving the screw member over excessively long distances during adjustment and blocking of the spring force, it is advisable that the screw element be provided with several rows of transverse holes in axial succession. This results in several coupling possibilities with the collar. That is, the screw element may be set at several different levels for effecting extraction.

The invention can be applied not only to so-called spring shackles wherein the spring housing is suspended, but also to pipe line supports wherein the spring housing must be mounted on a support structure in order to absorb the pipe loads. The support element, screw element, and collar then emerge and extend from the upper side of the housing. The support element also extends downward into the spring housing and is thus arranged in an upright position. In order to avoid harmful cants of the support element and the pressure spring in this structure, it is preferred that the spring rest and the end of the support element that engages the housing extend in radial directions.

In the usual embodiment with a helical spring arranged in the housing as the pressure spring and a support element arranged coaxially within the helical spring, the end of the support element may cooperate with a guide bearing fastened to the bottom plate of the housing, which guide bearing is engaged by the end of the support element to radially support the same.

To recapitulate, the invention is directed to an apparatus for supporting pipe lines or the like on a supporting structure. The apparatus includes a housing for connection with the supporting structure, the housing having a longitudinal axis and an end portion. Also included is biasing means, such as a helical spring, with opposite ends, one end of the biasing means being so disposed in the housing as to act against the housing end portion. There is a spring rest in the housing, the spring rest being coupled with the other end of the biasing means. Also included is a support element coupled with the spring rest and means, coupled between the support element and the spring rest, for longitudinally adjusting the support element relative to the spring rest in response to rotation of the support element. Finally, there is included means, selectively connectable with the support element, for blocking longitudinal movement of the spring rest relative to the housing in the longitudinal direction without blocking adjusting movement of the spring rest in response to rotation of the support element.

According to more specific aspects of the invention, there is included means, coupled between the housing and support element, for locking the support element in any relative longitudinal position with respect to the housing. The locking means includes a screw element threadably coupled with and movably adjustable relative to the support element. The blocking means cooperates with the screw element to selectively lock the screw elemet against relative rotation with respect to the support element. The screw element may be a threaded sleeve screwed on the support element.

The blocking means may include a crossbolt and the threaded sleeve may be fixed against longitudinal movement with respect to the housing by the crossbolt. There may be a bottom opening in the housing end portion and a rotatable collar axially fixed in the housing, the collar surrounding the support element and extending through the housing end portion, the blocking means selectively providing a rigid connection between the collar and the screw element. The screw element and collar may be provided with transverse holes, the supporting element may be provided with a hole which is elongated in the direction of the longitudinal axis of the housing, and the blocking means, as indicated above, may include a crossbolt which may be selectively passed through all of the holes. Plural rows of transverse holes may be arranged in axial succession in the screw element.

In one embodiment, the supporting element extends from the housing to the exterior thereof via the bottom opening in the housing end portion. In another embodiment, there is a top opening in the housing, the top opening being disposed longitudinally opposite and remote from the housing end portion. In the latter embodiment, the support element extends from the housing to the exterior thereof via the top opening. As indicated above, the biasing means may be a helical spring. The support element may be arranged coaxially with respect to the helical spring, a portion of the support element being disposed within the helical spring. Finally, in the latter-mentioned embodiment, there may be a guide bearing coupled between the housing end portion and one end of the support element.

Preferred embodiments of the invention are represented in the drawing and explained in the following description.

DESCRIPTION OF THE PREFERRED EMBODIMENTS

Figure 1:
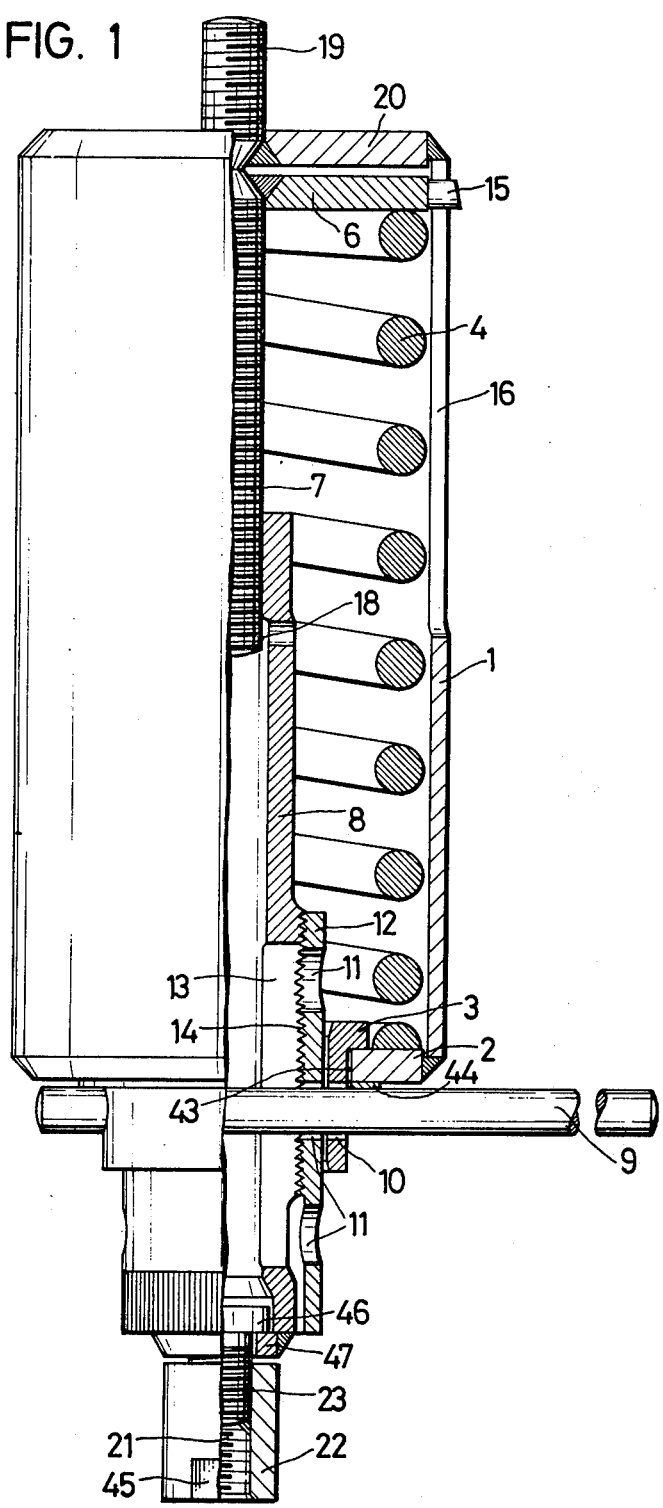
FIG. 1 is a longitudinal section through a spring shackle with elements in the starting position for "cold" and "hot" load blocking without presetting of the spring force of the pressure spring.
Figure 2:
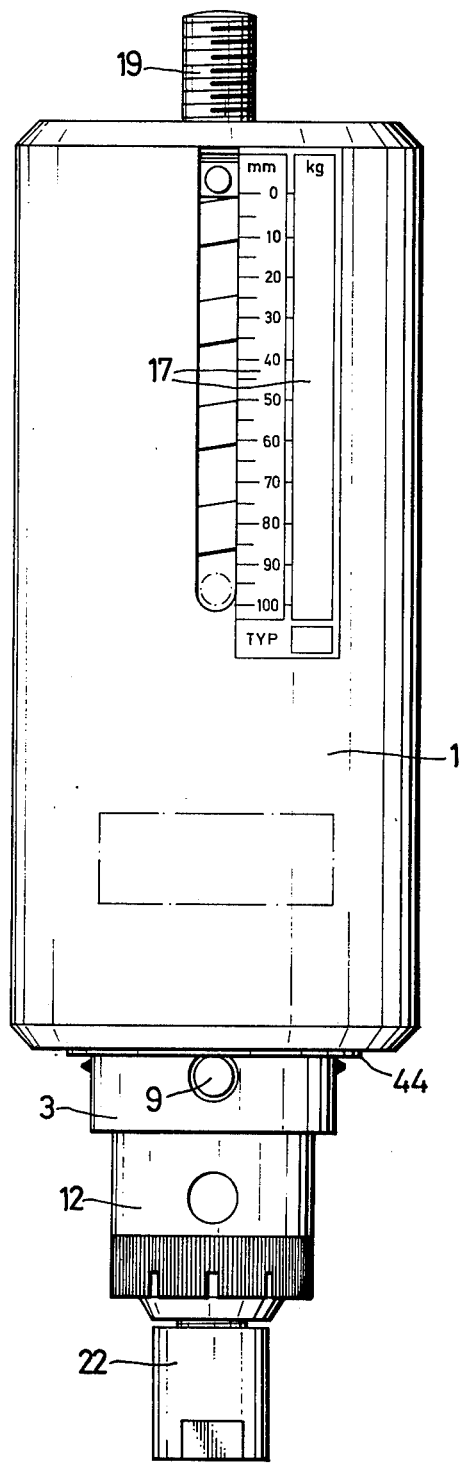
FIG. 2 is a side view corresponding to FIG. 1 with scale slot and scale on the spring housing.

The spring shackle according to FIGS. 1 and 2 consists of a spring housing 1 with a lower housing bottom or end portion 2 through whose central opening 43 a rotatable collar 3 passes, the collar having an annular shoulder resting on the inside edge of opening 43, the collar protruding from the outside of housing bottom 2. Between lower housing bottom 2 and spring rest 6 in spring housing 1, a biasing means, preferably in the form of helical pressure spring 4, is mounted. Fastened on spring rest 6 is a central threaded spindle 7 which extends toward housing bottom 2. A support element 8, in the form of a hollow threaded cylindrical member coupled with spindle 7, is adjustable in the longitudinal direction relative to spring rest 6 by a screw thread. Support element 8 emerges from opening 43 through lower housing bottom 2 toward the exterior of the housing.

A screw element 12 shaped as a threaded sleeve is screwed onto the lower outside screw thread 14 of support element 8 and is adjustable in the longitudinal direction. Screw element 12 emerges likewise toward the exterior of the housing from opening 43 between support element 8 and collar 3.

Collar 3 and screw element 12 include transverse holes 10 and 11 facing each other, while the support element includes longitudinal slots 13 facing each other. Transverse holes 10,11 and longitudinal slots 13 may be brought into alignment so that a crossbolt 9 can be passed therethrough. When crossbolt 9 is passed through the holes and slots, support element 8 is blocked against movement in either longitudinal direction. That is, support element 8 is blocked against extraction from spring housing 1 by way of crossbolt 9 engaging collar 3 which, in turn, is longitudinally fixed with respect to the housing, since the collar bears against the inside of the housing and, specifically, against the inside of the housing bottom 2. The support is also blocked against movement in the opposite direction by way of crossbolt 9 being pulled via an intermediate ring 44 against the outside of housing bottom 2 to retain support element 8.

A pin 15 on spring rest 6, passes through a slot 16 in spring housing 1. The position of pin 15 can be read off on a scale 17 to indicate the force setting of the pressure spring. Pin 15 serves also as safety against rotation of spring rest 6 or threaded spindle 7 in spring housing 1. To secure threaded spindle 7 against unintentional extraction from support element 8, the flanks of the thread are deformed at 18. The spring shackle is suspended from a bolt 19 in an upper end plate 20 of spring housing 1. The pipe line (not shown) is suspended, via a pull rod, (also not shown) which threadably engages the lower threaded portion 21 of a coupling element 22 which is secured against rotation with respect to the pull rod by means of a key face 45 and is rotatably connected, via a coupling pin 23, to the lower end of support element 8. Head 46 of coupling pin 23 extends beyond an inner flange 47 of support element 8.

Coupling element 22 has the capability of remaining rotationally stationary when support element 8 is rotated, so that, during rotation of the support element, the pull rod is not, by turning along with the support element, threadably retracted from the coupling element or displaced relative thereto.

Figure 3A:
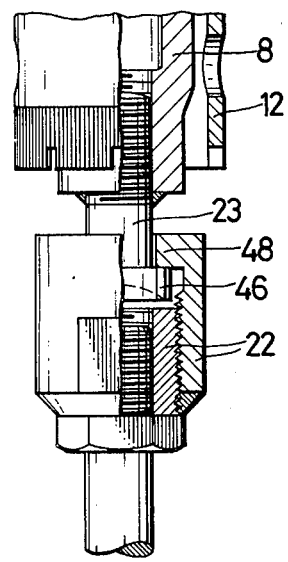
FIGS. 3a and b represent alternative coupling arrangements by means of which the pull and support rods of the pipe lines can be connected with the support element so as to be freely rotatable.

FIG. 3a shows another embodiment of the coupling element wherein coupling pin 23 is locked in the lower end of support element 8 and wherein its head 46 extends beyond an inner flange of coupling element 22.

Figure 3B:
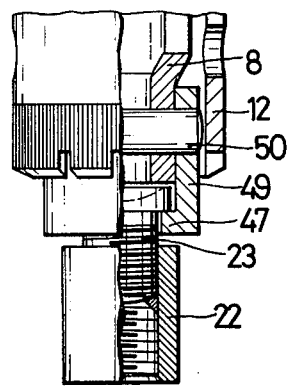

FIG. 3b shows an embodiment wherein manufacture is simplified and wherein the head of coupling pin 23 extends beyond an inner flange 47 of a separate coupling sleeve 49 which is slid upon the lower end of support element 8 and is connected therewith by a crossbolt 50.

Figure 4:
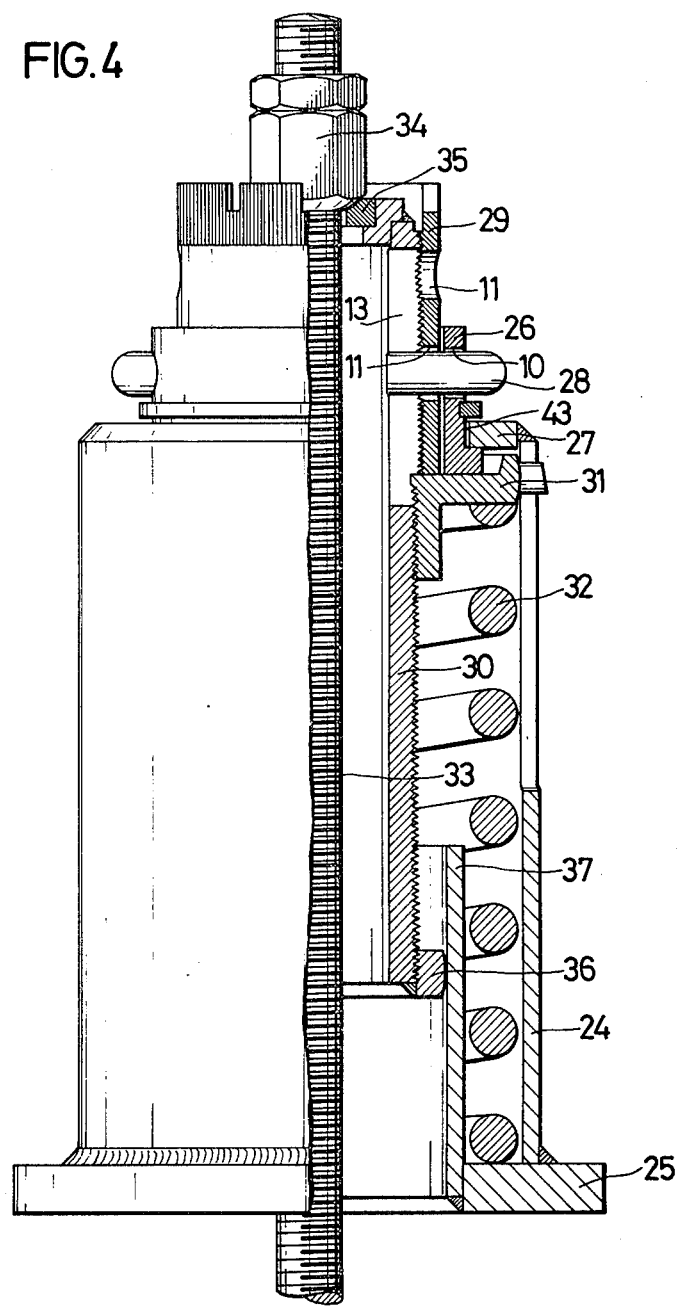
FIG. 4 is a longitudinal section according to FIG. 1 through a spring shackle with a spring housing capable of being installed in an upright position, wherein the presetting adjustment elements and the cold and hot load blocking means are provided at the head of the spring housing.
Figure 5:
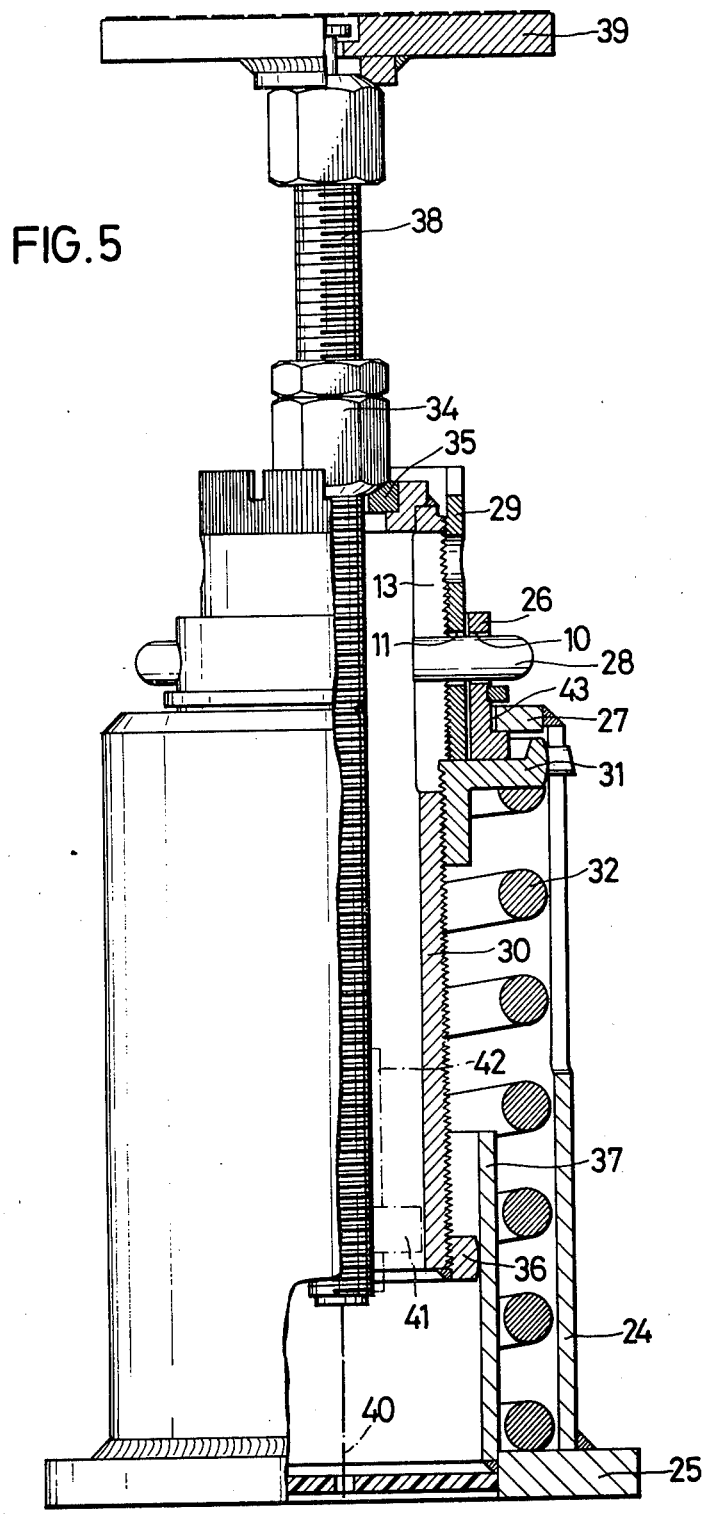
FIG. 5 shows a longitudinal section, corresponding to that of FIG. 1, of a different embodiment, namely, a spring support for the resilient support of turbine connection lines.

In FIGS. 4 and 5 two further embodiments are shown. Among these and other figures of the drawings, like elements are designated by the same reference numerals. In FIGS. 4 and 5 spring housing 24 is provided with a bottom flange 25 for securing to a bracket or the like. A collar 26 is rotatably fastened on the upper end plate 27 of spring housing 24 and can be coupled with support element 30 by means of a fastener 28 with inwardly extending members for locking engaging support element 30 from the outside at 10, 11,13 through screw element 29 so that the elements may be rotated together. By rotation of support element 39, whereon a spring rest 31 can be screwed, the latter travels, for example, downwardly and thereby effects compressive pre-loading and thus presetting of pressure spring 32. The pipe is suspended from a pull rod 33 which is threadably engaged with a nut 34 having a semi-spherical support surface and resting on a corresponding ball cup 35 of support element 30, so that pull rod 33 can move in a pendulous manner. The forces which develops when pull rod 33 deviates from the vertical axis may create hazardous conditions in that pressure spring 32 might be twisted with respect to spring rest 31 or screw element 29 might perhaps become caught in collar 26. In order to avoid this, a semi-spherical ring 36 is disposed on sleeve 37 which sleeve, in turn, is welded to flange 25 to bring about radial guidance. Spring rest 31 is also shaped in such a way that it brings about additional guidance when abutting against the inside of the spring housing, so that the screw element can always be advanced or retracted in an easy motion.

After the removal of fastener 28, the blocking of pressure spring 32 is eliminated, and support element 30 and screw element 29 along with spring rest 31 and pull rod 33 are freely movable in a vertical direction when the pipes are loaded.

The embodiment shown in FIG. 5 does not support the pipe line in a suspended manner but is constructed to support a pipe from below. It differs from the spring shackle shown in FIG. 4 in that, instead of pull rod 33, a threaded spindle 38 is provided as the pressure spindle. Spindle 38 is provided at the top with a bracket 39 for carrying the pipe load. In order to fix the threaded spindle 38 in the spring housing during the transportation and installation, a resilient support 40, which may be dispensed with later, is provided. As a substitute, a corresponding flexible element 41 may be provided within support element 30. Flexible element 41 is secured by sleeves 42 of different sizes.

The operation is the same with all embodiments shown. In the adjustment and presetting of the spring force prior to installation, the spring rest 6,31 is adjusted while the prespecified support distance is being observed, the crossbolt 9,28 being extracted. Adjustment continues until pressure spring 4,32 exhibits the necessary force. Then, threaded element 12,29 is adjusted by rotation with respect to the support element 8,30 until one of the transverse holes 11 is in alignment with the transverse hole 10 of the collar 3,26. A further small common rotation of the two elements might be necessary in order to bring transverse holes 10,11 into alignment with the longitudinal slot 13 of support element 8,30. Crossbolt 9,28 may then be inserted to maintain the preset force when the outside load is removed. The apparatus can then be installed in the preset state. If, after the installation, crossbolt, 9,28 should not be readily extractable, the prespecified equilibrium has not yet been achieved. It is still possible, however, to bring about a readjustment of spring rest 6,31 and thus of the spring force by common rotation of collar 3,26 screw element 8,29, and support element 8,30. Such readjustment is carried out until crossbolt 9,28 is relieved and equilibrium has been achieved.

An essential feature of the invention resides in the fact that, by the mere actuation of the crossbolt, the force necessary for the maintenance of a specific level of a pipe line can always be adjusted, controlled and blocked. Due to the capacity of the support element to rotate when the blocking device becomes effective, only one rotation of the support element by a certain amount is necessary for extracting the crossbolt. Thus, an exact equilibrium between the then prevailing spring force and the load of the pipe line may be brought about so that the pipe line is not displaced when the blocking is eliminated. This can be accomplished not only during the initial installation but also at any later time when the load of the pipe line or other conditions have changed. A readjustment and also a blocking of any fine adjustment is always possible. Thus, the occurrence of excessive forces at any stage is avoided, and, accordingly, the spring shackle of the invention serves to increase safety in high load pipe line systems.

What is claimed:

1. An apparatus for supporting pipe lines or the like on a supporting structure, the apparatus comprising:
    a. a housing for connection with the supporting structure, said housing having a longitudinal axis and an end portion;
    b. biasing means with opposite ends, one end of said biasing means being so disposed in said housing as to act against said housing end portion;
    c. a spring rest in said housing, said spring rest being coupled with the other end of said biasing means;
    d. a support element coupled with said spring rest;
    e. means, coupled between said support element and spring rest, for longitudinally adjusting said support element relative to said spring rest in response to rotation of said support element;
    f. means, selectively connectable with said support element, for blocking movement of said spring rest relative to said housing in either longitudinal direction without blocking adjusting movement of said spring rest in response to rotation of said support element.

2. An apparatus as defined in claim 1, including, means coupled between said housing and support element, for locking said support element in any relative longitudinal position with respect to said housing.

3. An apparatus as defined in claim 2:
    a. wherein said locking means includes a movable element coupled with and movably adjusable relative to said support element; and
    b. wherein said blocking means cooperates with said movable element to selectively lock said movable element against relative movement with respect to said support element.

4. An apparatus as defined in claim 3 wherein said screw element is a threaded sleeve screwed on the support element.

5. An apparatus as defined in claim 4 wherein:
    a. said blocking means includes a crossbolt; and
    b. said threaded sleeve may be fixed against longitudinal movement with respect to said housing by said crossbolt.

6. An apparatus as defined in claim 3 including:
    a. a bottom opening in said housing end portion;
    b. a rotation collar axially fixed in said housing, said collar surrounding said support element and extending through said housing end portion, said blocking means selectively providing a rigid connection between said collar and said screw element.

7. An apparatus as defined in claim 6, wherein:
    a. said screw element and said collar are provided with transverse holes;
    b. said support element is provided with a hole which is elongated in the direction of said longitudinal axis of said housing; and
    c. said blocking means includes a crossbolt which may selectively be passed through all of said holes.

8. An apparatus as defined in claim 7, wherein plural rows of said transverse holes are arranged in axial succession in said screw element.

9. An apparatus as defined in claim 6, wherein said support element extends from said housing to the exterior thereof via said bottom opening in said housing end portion.

10. An apparatus as defined in claim 1:
    a. including a top opening in said housing, said top opening being disposed longitudinally opposite and remote from said housing end portion;
    b. wherein said support element extends from said housing to the exterior thereof via said top opening.

11. An apparatus as defined in claim 10:
    a. wherein said biasing means is a helical spring and said support element is arranged coaxially with respect to said helical spring, a portion of said support element being disposed within said helical spring;
    b. including a guide bearing coupled between said housing end portion and one end of said support element.

12. An apparatus as defined in claim 3:
    a. wherein said movable element is a screw element threadably coupled with and movably adjustable relative to said support element; and
    b. wherein said blocking means cooperates with said screw element to selectively lock said screw element against relative rotation with respect to said support element.

* * * * *